(12) United States Patent
Slaats et al.

(10) Patent No.: US 7,931,293 B2
(45) Date of Patent: Apr. 26, 2011

(54) CURTAIN AIRBAG

(75) Inventors: Paul Maria-Antonius Slaats, Ann Arbor, MI (US); Pongdet Paul Wipasuramonton, Rochester, MI (US); Mark Andrew Steinbach, Clawson, MI (US); Richard Wiik, FortGratiot, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/010,103

(22) Filed: Jan. 18, 2008

(65) Prior Publication Data
US 2009/0184499 A1    Jul. 23, 2009

(51) Int. Cl.
*B60R 21/16* (2006.01)
*B60R 21/213* (2011.01)
(52) U.S. Cl. .................. 280/730.2; 280/743.1
(58) Field of Classification Search .................. 280/729, 280/730.2, 743.1
See application file for complete search history.

(56) References Cited

U.S. PATENT DOCUMENTS

| | | | |
|---|---|---|---|
| 6,170,860 B1 * | 1/2001 | Denz et al. ................. | 280/730.2 |
| 6,338,498 B1 * | 1/2002 | Niederman et al. ....... | 280/728.2 |
| 6,481,743 B1 * | 11/2002 | Tobe et al. ................. | 280/728.2 |
| 6,527,296 B2 * | 3/2003 | Bakhsh et al. ............. | 280/730.2 |
| 6,830,262 B2 * | 12/2004 | Sonnenberg et al. ...... | 280/730.2 |
| 7,077,425 B2 * | 7/2006 | Ogawa et al. .............. | 280/730.2 |
| 7,500,694 B2 * | 3/2009 | Heudorfer et al. .......... | 280/729 |
| 2005/0127644 A1 * | 6/2005 | Kino et al. ................. | 280/730.2 |
| 2005/0134028 A1 * | 6/2005 | Noguchi et al. ........... | 280/730.2 |
| 2006/0066079 A1 * | 3/2006 | Inoue et al. ................ | 280/730.2 |
| 2006/0192368 A1 * | 8/2006 | Hall et al. .................. | 280/730.2 |
| 2009/0026742 A1 * | 1/2009 | Noguchi et al. ........... | 280/730.2 |

* cited by examiner

*Primary Examiner* — Paul N Dickson
*Assistant Examiner* — James English
(74) *Attorney, Agent, or Firm* — Foley & Lardner LLP

(57) ABSTRACT

An airbag is provided. The airbag is configured to extend longitudinally along a side of a vehicle and includes a first section configured to inflate in a longitudinal and vertical direction, a second section coupled to the first section and configured to inflate in a longitudinal and vertical direction, an inlet for receiving inflation gas from an inflator, tabs positioned at the top of the airbag for attaching the airbag to a ceiling of the vehicle and chambers positioned between the tabs along the top of the airbag, wherein the chambers stabilize the airbag during deployment.

18 Claims, 3 Drawing Sheets

CURTAIN AIRBAG

BACKGROUND

The present invention relates generally to the field of airbags. More specifically, the invention relates to curtain type airbags configured to deploy along the side of the passenger cabin of vehicle.

Curtain or roof rail airbags are typically deployed from behind a trim element in a vehicle. The airbag deploys between the sheet metal of the vehicle and the trim element and then out along vehicle side windows into the vehicle cabin to protect an occupant or occupants. Conventional curtain airbags are provided with inflated gas chambers for occupant head cushioning. Most of the airbags form a continuous gas channel in the upper area of the airbag close to the roof rail area. When the airbag is deployed these chambers break through the vehicle trim first.

Government agencies have indicated that certain requirements for mitigating the ejection of an occupant from a vehicle will be mandated in the future. Curtain airbag technology will become important in these ejection mitigation efforts. To limit the size of a curtain airbag inflator, it is desirable for the volume of the cushion airbag to be used as efficiently as possible while extending throughout the height of the side windows of the vehicle to insure occupant safety.

SUMMARY

According to one embodiment, an airbag is configured to extend longitudinally along a side of a vehicle and includes a first section configured to inflate in a longitudinal and vertical direction, a second section coupled to the first section and configured to inflate in a longitudinal and vertical direction, an inlet for receiving inflation gas from an inflator, tabs positioned at the top of the airbag for attaching the airbag to a roof-rail of the vehicle and chambers positioned between the tabs along the top of the airbag, wherein the chambers stabilize the inflated airbag during deployment.

It is to be understood that both the foregoing general description and the following detailed description are exemplary and explanatory only, and are not restrictive of the invention as claimed.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

Figure 1:
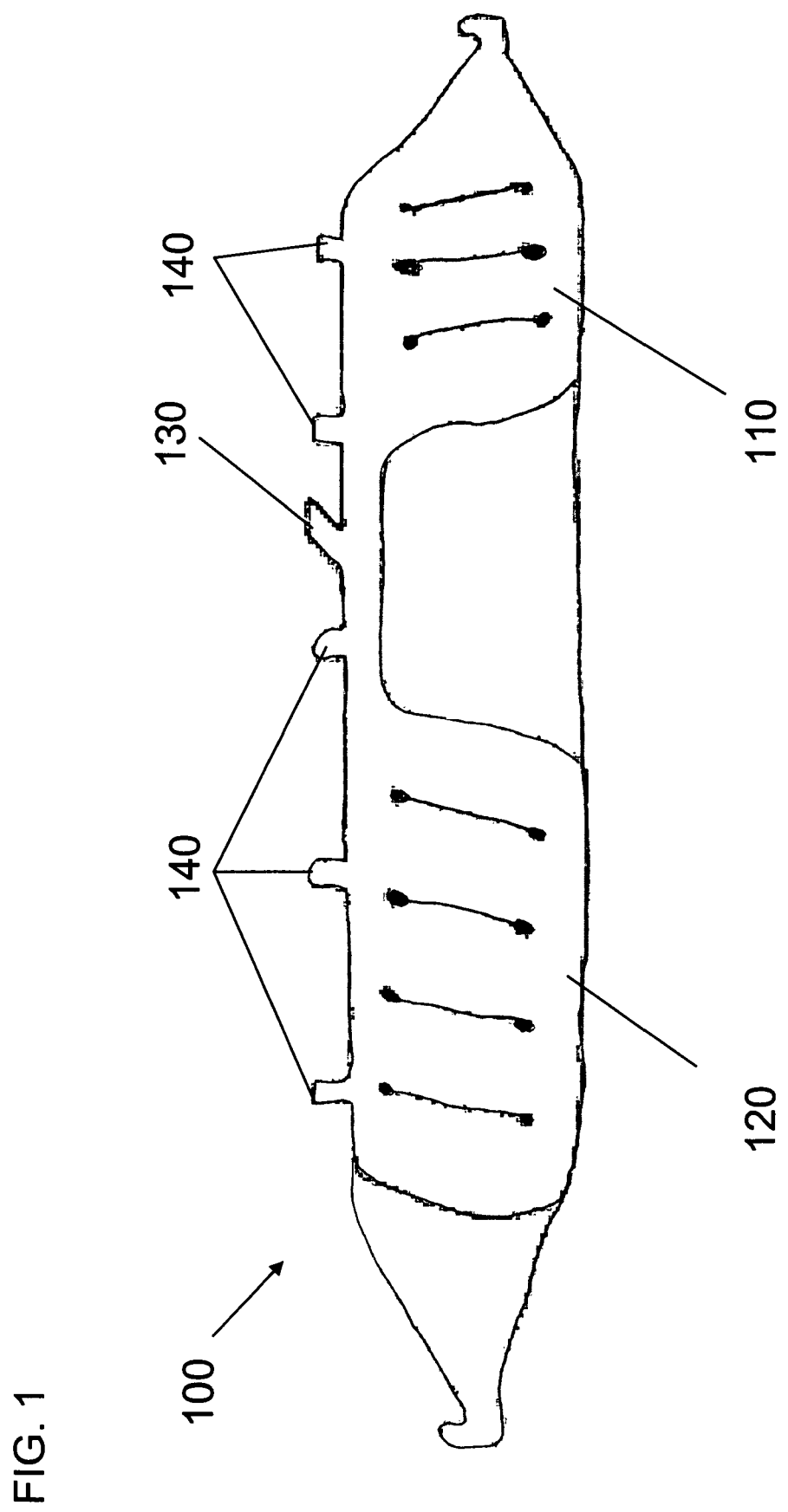
FIG. 1 is a sectional view of a conventional curtain airbag.

Referring to FIG. 1, airbag 100 may include a first section 110 and a second section 120. The first section 110 may be integrally formed with the second section 120, such that air may flow (in fluid communication) between the two sections 110, 120. Alternatively, the first section 110 may be a separate section that is connected (directly or indirectly) to the second section 120. The first section 110 may be rolled, folded or unfolded. The second section 120 may be folded or rolled in any appropriate manner for a roof rail airbag. In the embodiment shown in FIG. 1, both the first 110 and second section 120 are configured to inflate and deploy downward between a headliner trim and a roof-rail into a vehicle cabin area along the side windows in front of trim components. Airbag 100 may be constructed from materials known in the art.

Still referring to FIG. 1, the airbag 100 is shown to include an inflation inlet shown as inlet 130. Inlet 130 is used to connect an inflator (not shown) to airbag 100. As shown in FIG. 1, inlet 130 is positioned between first section 110 and second section 120. When airbag 100 is deployed, this position of inlet 130 allows both sections 110, 120 to be quickly and simultaneously filled. In an alternative embodiment, inlet 130 may be located in first section 110, or may be located in second section 120. Alternatively, separation gas introduction ports may be provided so that inflation gas is provided to the first and second inflatable sections of the airbag in a controlled manner.

Airbag 100 is shown in FIG. 1 to include multiple vertical chambers in a first section 110 and multiple vertical chambers in a second section 120. The airbag 100 may be configured in multiple shapes and sizes. Airbag 100 may comprise any number, shape and size of horizontal and/or vertical chambers. Airbag 100 also includes multiple attachment points 140. Attachment points 140 may be positioned at any point along the top of airbag 100 and may be constructed from materials known in the art.

Figure 2:
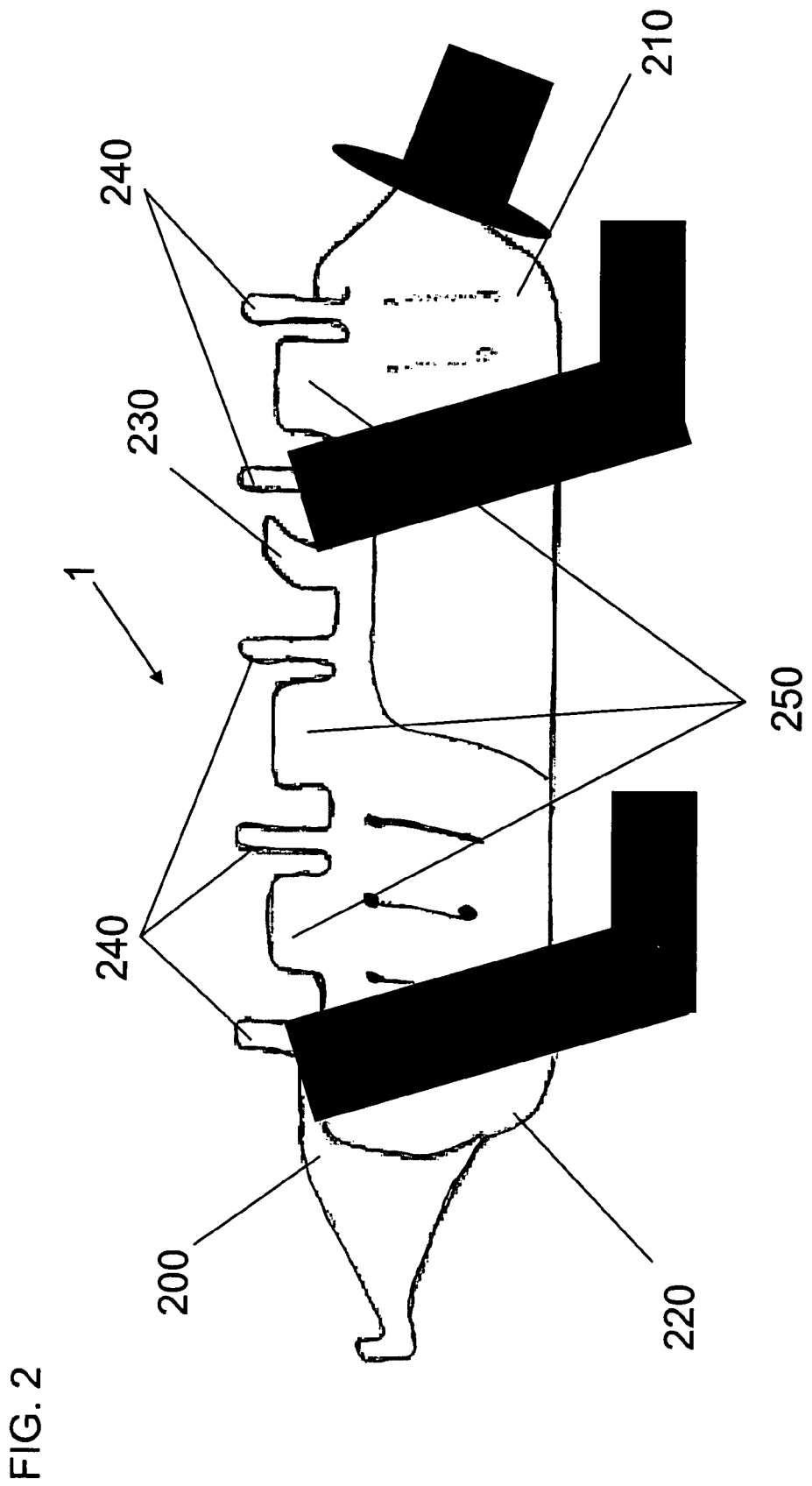
FIG. 2 is a sectional profile view of a vehicle having a curtain airbag according to one embodiment.
Figure 3:
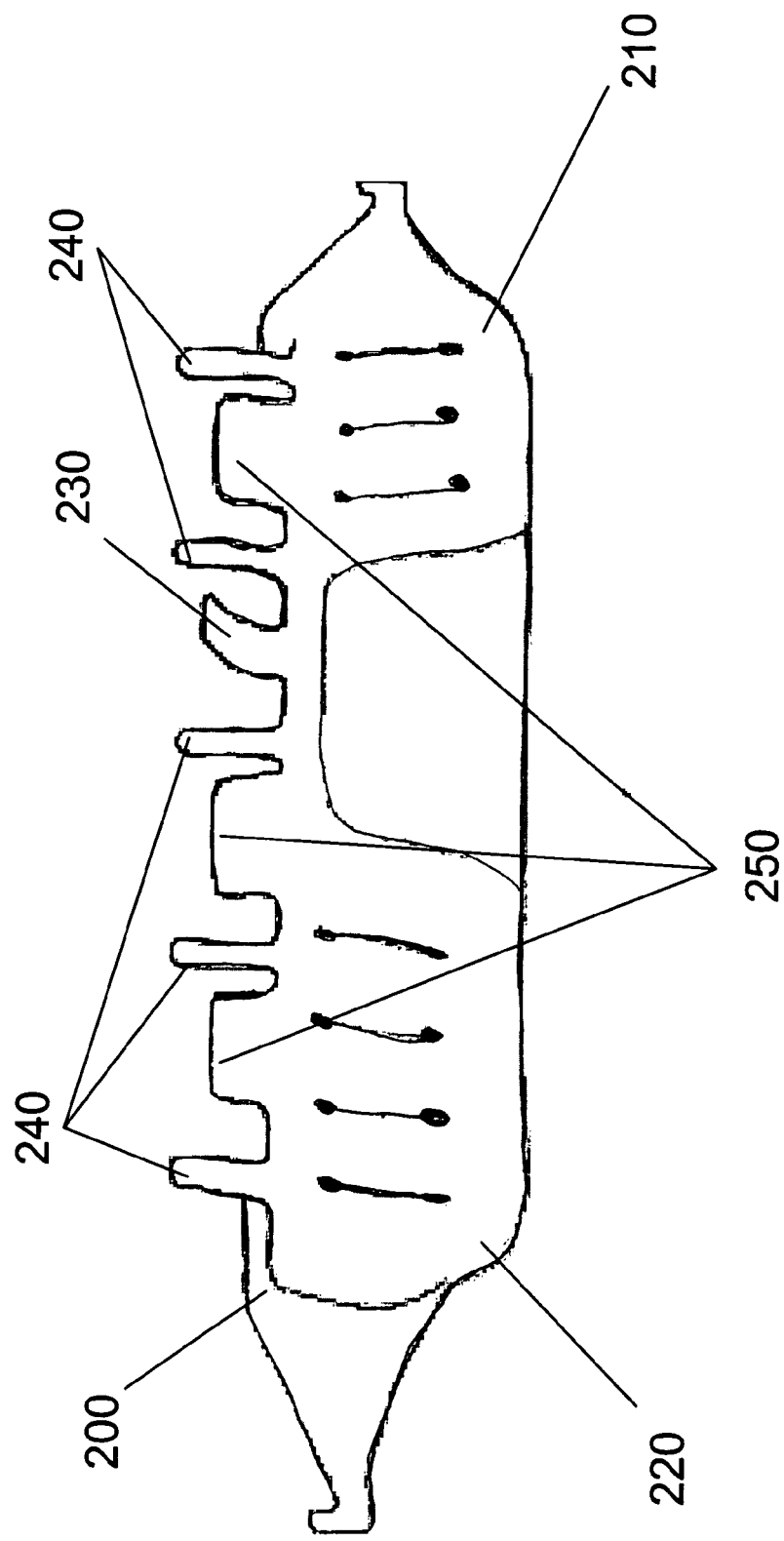
FIG. 3 is a sectional view of a curtain airbag according to one embodiment.

FIGS. 2 and 3 show a sectional profile view of a vehicle 1 having an airbag 200 and an airbag 200 according to one embodiment. The airbag 200 may include a first section 210 and a second section 220. The first section 210 may be integrally formed with the second section 220, such that air may flow (in fluid communication) between the two sections 210, 220. Alternatively, the first section 210 may be a separate section that is connected (directly or indirectly) to the second section 220. The first section 210 may be rolled, folded or unfolded. The second section 220 may be folded or rolled in any appropriate manner for a roof rail airbag. In the embodiment shown in FIG. 3, both the first 210 and second section 220 are configured to inflate and deploy downward between a headliner trim and a roof-rail into a vehicle cabin area in front of trim components. Airbag 200 may be constructed from materials known in the art.

Still referring to FIG. 3, the airbag 200 is shown to include an inflation inlet shown as inlet 230. Inlet 230 is used to connect an inflator (not shown) to airbag 200. As shown in FIG. 1, inlet 230 is positioned between first section 210 and second section 220. When airbag 200 is deployed, this position of inlet 230 allows both sections 210, 220 to be quickly and simultaneously filled. In an alternative embodiment, inlet 230 may be located in first section 210, or may be located in second section 220. Alternatively, separation gas introduction ports may be provided so that inflation gas is provided to the first and second inflatable sections of the airbag in a controlled manner.

Airbag 200 is shown in FIG. 3 to include multiple vertical chambers in the first section 210 and multiple vertical chambers in the second section 220. The airbag 200 may be configured in multiple shapes and sizes. Airbag 200 may comprise any number, shape and size of horizontal and/or vertical chambers. Airbag 200 also includes multiple elongated attachment tabs 240. The elongated attachment tabs 240 may be positioned at any point along the top of airbag 200 and may be constructed from materials known in the art. The elongated attachment tabs 240 are longer than the conventional attachment points 140 shown in FIG. 1. For example, the attachment tabs 240 may extend, but not limited to, as much as 2.5 inches longer than conventional tabs from their attachment point. The elongated attachment points 240 insure that the bottom of the airbag overlaps the beltline of the vehicle 1.

In addition, the airbag 200 includes upper chambers 250. The upper chambers 250 are positioned between the elongated attachment tabs 240 along the upper length of the airbag 200. Upon deployment, the upper chambers 250 act to stabilize the airbag 200 by pushing against the roof-rail surface to insure that the airbag 200 stays deployed at its full length along the height of the vehicle. The inflated upper chambers also help minimize vertical oscillation motions. The upper chambers 250 may also act as a regular cushioning chamber. Further, by positioning the attachment tabs 240 along the length of the airbag in conjunction with the upper chambers 250, the overall volume of the airbag can be kept small. In other words, the inflated cushion would have to cover the full height from the roof-rail down to at least the window sill. With the mounting tabs and upper chambers, the tabs can be lengthened; and the upper chambers will stabilize the airbag deployment and give the occupant(s) protection. Thus the inflated cushion can be minimized. Therefore, the inflator output can also be kept small. It is noted that the lengthened tabs essentially lower the upper gas distribution channel (i.e. the straight channel just below the upper chambers and the tabs in FIG. 3). Since the upper channel remains straight, the gas distribution is relatively the same.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An airbag configured to extend longitudinally along a side of a vehicle comprising:
   a first section configured to inflate in a longitudinal and vertical direction;
   a second section coupled to the first section and configured to inflate in a longitudinal and vertical direction;
   an inlet for receiving inflation gas from an inflator;
   tabs positioned at the top of the airbag for attaching the airbag to a roof-rail or vehicle side structure of the vehicle, wherein the tabs are elongated such that when the airbag is deployed the airbag provides window coverage and head protection along the side of the vehicle; and
   chambers positioned between the tabs along the top of the airbag such that the tabs extend above an upper edge of the chambers, wherein when the airbag is deployed the chambers are not folded relative to the first and second sections and are located between the tabs above the first and second sections in contact with a roof-rail surface of the vehicle to stabilize the position of the airbag after the airbag is deployed.

2. An airbag as claimed in claim 1, wherein the first section and second section have multiple vertical chambers.

3. An airbag as claimed in claim 1, wherein the first section and second section are coupled such that air may flow between the first section and the second section.

4. An airbag as claimed in claim 1, wherein the inlet is positioned at the top of the airbag between the first section and second section.

5. An airbag as claimed in claim 1, wherein the tabs are elongated such that when the airbag is deployed the bottom of the airbag is positioned below a beltline of the vehicle.

6. A vehicle, comprising:
   an airbag configured to extend longitudinally along a side of a vehicle including:
      a first section configured to extend in a longitudinal and vertical direction;
      a second section coupled to the first section and configured to extend in a longitudinal and vertical direction;
      an inlet for receiving inflation gas from an inflator;
      tabs positioned at the top of the airbag for attaching the airbag to a ceiling of the vehicle, wherein the tabs are elongated such that when the airbag is deployed the airbag provides window coverage and head protection along the side of the vehicle; and
      chambers positioned between the tabs along the top of the airbag such that the tabs extend above an upper edge of the chambers, wherein when the airbag is deployed the chambers are not folded relative to the first and second sections and are located between the tabs above the first and second sections in contact with a roof-rail surface of the vehicle to stabilize the airbag once the airbag is deployed.

7. A vehicle as claimed in claim 6, wherein the first section and second section have multiple vertical chambers.

8. A vehicle as claimed in claim 6, wherein the first section and second section are coupled such that air may flow between the first section and the second section.

9. A vehicle as claimed in claim 6, wherein the inlet is positioned at the top of the airbag between the first section and second section.

10. A vehicle as claimed in claim 6, wherein the tabs are elongated such that when the airbag is deployed the bottom of the airbag is positioned below a beltline of the vehicle.

11. An airbag as claimed in claim 1, wherein the chambers push against the roof-rail.

12. An airbag as claimed in claim 1, wherein the chambers push the airbag down in a vertical direction to insure that the airbag stays deployed at its full length.

13. An airbag as claimed in claim 1, wherein the chambers minimize vertical oscillation of the airbag once the airbag is deployed.

14. A vehicle as claimed in claim 6, wherein the chambers push against the roof-rail.

15. A vehicle as claimed in claim 6, wherein the chambers push the airbag down in a vertical direction to insure that the airbag stays deployed at its full length.

16. A vehicle as claimed in claim 6, wherein the chambers minimize vertical oscillation of the airbag once the airbag is deployed.

17. An airbag configured to extend longitudinally along a side of a vehicle comprising:
   a section configured to inflate in a longitudinal and vertical direction;
   an inlet for receiving inflation gas from an inflator;
   tabs positioned at the top of the airbag for attaching the airbag to a roof-rail or vehicle side structure of the vehicle, wherein the tabs are elongated such that when the airbag is deployed the airbag provides window coverage and head protection along the side of the vehicle; and chambers positioned between the tabs along the top of the airbag such that the tabs extend above an upper edge of the chambers, wherein when the airbag is deployed the chambers are not folded relative to the first and second sections and are located between the tabs above the first and second sections in contact with a roof-rail surface of the vehicle to stabilize the position of the airbag after the airbag is deployed.

18. A vehicle, comprising:

an airbag configured to extend longitudinally along a side of a vehicle including:

a section configured to extend in a longitudinal and vertical direction;

an inlet for receiving inflation gas from an inflator;

tabs positioned at the top of the airbag for attaching the airbag to a ceiling of the vehicle, wherein the tabs are elongated such that when the airbag is deployed the airbag provides window coverage and head protection along the side of the vehicle; and chambers positioned between the tabs along the top of the airbag such that the tabs extend above an upper edge of the chambers, wherein when the airbag is deployed the chambers are not folded relative to the first and second sections and are located between the tabs above the first and second sections in contact with a roof-rail surface of the vehicle to stabilize the position of the airbag after the airbag is deployed.

\* \* \* \* \*